(12) United States Patent
Yousef (10) Patent No.: US 7,710,857 B2
(45) Date of Patent: May 4, 2010

(54) COHERENT DETECTION FOR DIFFERENTIALLY ENCODED OFDM SYSTEMS

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 349 days.

(21) Appl. No.: 11/766,811

(22) Filed: Jun. 22, 2007

(65) Prior Publication Data
US 2008/0316909 A1     Dec. 25, 2008

(51) Int. Cl.
H04L 27/28     (2006.01)
(52) U.S. Cl. .................................. 370/208; 375/260
(58) Field of Classification Search ............ 370/208
See application file for complete search history.

(56) References Cited

U.S. PATENT DOCUMENTS

| | | | | |
|---|---|---|---|---|
| 6,928,120 | B1 * | 8/2005 | Zhang | 375/260 |
| 7,173,979 | B1 | 2/2007 | Badri et al. | |
| 2003/0185326 | A1 * | 10/2003 | Kolze | 375/371 |
| 2004/0190438 | A1 * | 9/2004 | Maltsev et al. | 370/206 |

OTHER PUBLICATIONS

Frenger, Pal et al., "A Decision Directed Coherent Detector for OFDM," IEEE 46th Vehicular Technology Conference, Apr. 28-May 1, 1996, pp. 1584-1588.

Lim, Eui-Cheol et al., "Reliable region decision DDCE and erasure replacement decoding of OFDM system," Asia-Pacific Conference on Communications, APCC 2005, Oct. 3-5, 2005, pp. 793-797.

Haas, Erik et al., "Analysis of Two-Dimensional Differential Demodulation for OFDM," IEEE Global Telecommunications Conference 2000, GLOBECOM '00, Nov. 27-Dec. 1, 2000, pp. 751-755.

* cited by examiner

*Primary Examiner*—Huy D Vu
*Assistant Examiner*—Benjamin Lamont
(74) *Attorney, Agent, or Firm*—Rahman LLC (57) ABSTRACT

A method and system for coherent detection in which an OFDM symbol is multiplied by the complex conjugate of the previous OFDM symbol, which is obtained by one OFDM symbol delay and a complex conjugation circuit. This soft decision is passed through a QPSK slicer to obtain a hard decision. The soft decision is then divided by the hard decisions. The channel phase change between the two OFDM symbols is then obtained. For the first OFDM symbol, the channel is computed. A channel estimate for each ODFM symbol is computed from corresponding channel estimates and channel phase difference estimates. The channel phase difference between each two OFDM symbols is computed. The channel phase difference is passed through an exponent operation and multiplied by the soft decision to obtain a refined soft decision that is then passed through another QPSK slicer to obtain the final hard decision.

20 Claims, 10 Drawing Sheets

COHERENT DETECTION FOR DIFFERENTIALLY ENCODED OFDM SYSTEMS

BACKGROUND

1. Technical Field

The embodiments herein generally relate to mobile television (TV) technologies, and, more particularly, to mobile TV differentially encoded orthogonal-frequency-division-multiplexing (OFDM) systems.

2. Description of the Related Art

Figure 1:
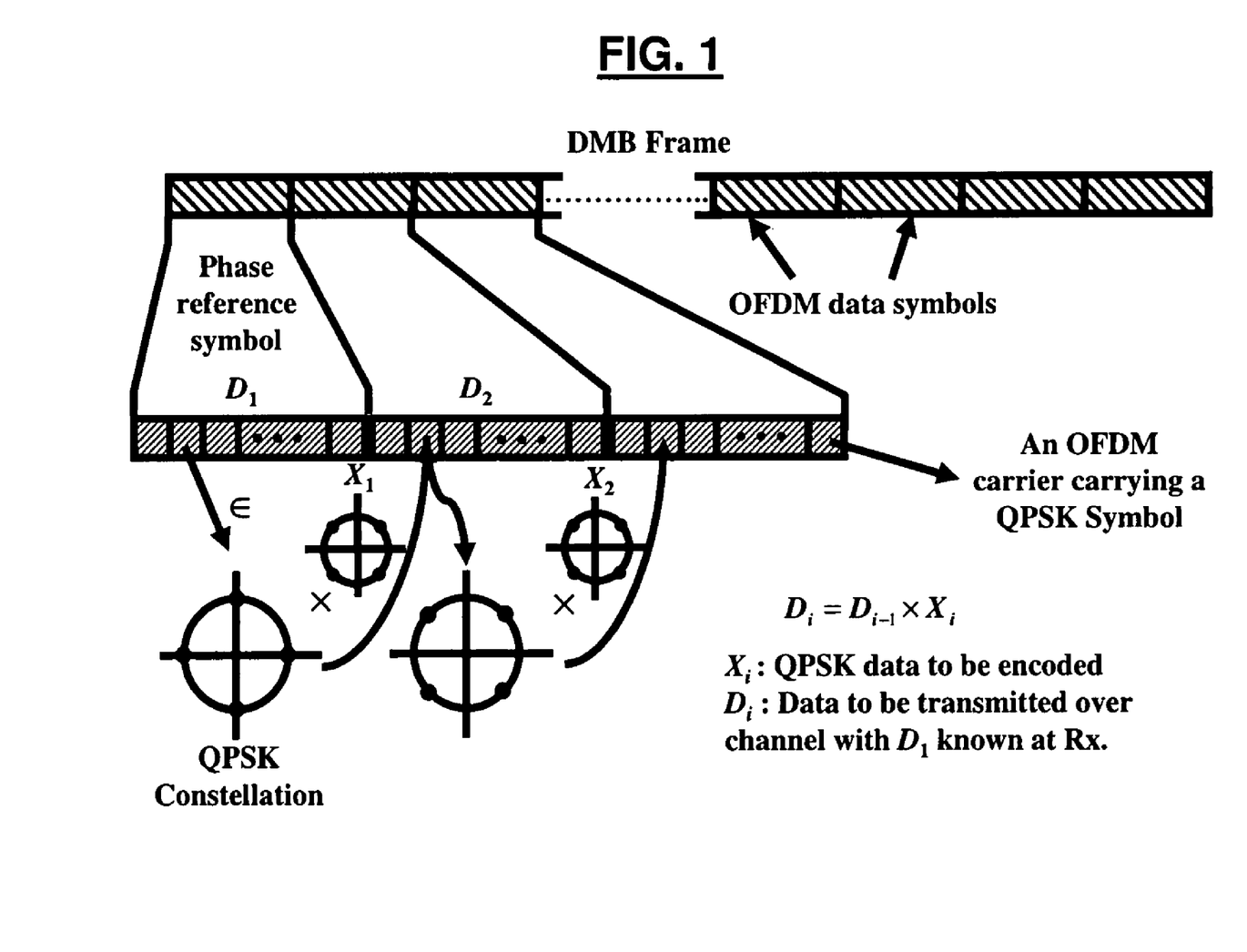
FIG. 1 is a schematic diagram illustrating differential modulation in DMB assuming Mode I.

FIG. 1 summarizes the differential modulation procedure that is described in a differentially encoded OFDM system such as terrestrial digital multimedia broadcasting (T-DMB). The phase reference symbol is perfectly known at the receiver after the transmission mode is detected. In other words, the Quadrature phase-shift keying (QPSK) symbols in every OFDM carrier are known at the receiver. The phase reference symbol belongs to a rotated quadrature phase-shift keying (QPSK) constellation as shown in FIG. 1 for Mode I. The data to be transmitted belongs to a normal QPSK constellation and is denoted by $X_i$. The data that is transmitted over the OFDM carriers in each OFDM symbol is obtained according to the following equation (assuming Mode I):

$$D_i = D_{i-1} \times X_i$$

where $D_1$ is the phase reference symbol. The frequency-domain representation of the received symbols, $R_i$, at the receiver is given by $R_i = D_i \times H_i$, $i = 2, \ldots, 76$, where $H_i$ is the channel seen by the ith OFDM symbol.

At the receiver, the soft decisions that are passed to the Viterbi decoder are obtained as follows:

$$R_i \times R^*_{i-1} = |D_{i-1}|^2 \times X_i \times H_i \times H^*_{i-1}.$$

In this context, "soft decisions" refers to a complex number that represents the location of the received QPSK symbol with respect to the transmitted constellation. A hard decision could simply be obtained by choosing the QPSK constellation point that is closest to the received soft decision.

The quantity $|D_{i-1}|^2$ does not affect the decision because it is pure real. These soft decisions would lead to a correct decision on what has been transmitted if and only if the channel has not changed from one symbol to the next. In other words, if $H_i \equiv H_{i-1}$, then the soft decisions will reduce to:

$$R_i \times R^*_{i-1} = |D_{i-1}|^2 \times X_i \times |H_i|^2,$$

and effectively, $X_i$ is fed to the Viterbi decoder. The problem now is that this assumption is not accurate. Accordingly, there remains a need for a new coherent detection technique for differentially encoded OFDM systems.

SUMMARY

In view of the foregoing, an embodiment provides a method of performing coherent detection for differentially encoded OFDM systems and a program storage device readable by computer comprising a program of instructions executable by the computer to perform the method of performing coherent detection for differentially encoded OFDM systems, wherein the method comprises providing a series of consecutive OFDM data symbols in a DMB frame of a signal transmitted to a wireless receiver; storing a channel phase value of a first OFDM data symbol in the series of consecutive OFDM data symbols; calculating a primary estimate of the channel phase difference by hard thresholding the first OFDM data symbol; combining the channel phase value of the first OFDM data symbol with the primary estimate of the channel phase difference; generating a secondary estimate of a the channel phase difference of a second OFDM data symbol based on the combined channel phase value of the first OFDM data symbol and the primary estimate of the channel phase difference, wherein the first and second OFDM data symbols are consecutive OFDM data symbols in the DMB frame; correcting decisions of which OFDM data symbols to encode based on the secondary estimate of the channel phase difference; and sending the corrected decisions to a Viterbi decoder in the wireless receiver for decoding of the OFDM data symbols.

Preferably, the calculation of the primary estimate comprises shifting a signal phase of the signal by a predetermined value. Moreover, the method may further comprise plotting the series of consecutive OFDM data symbols in a graphical format; and connecting the plotted OFDM data symbols with a line. Additionally, the method may further comprise determining a region of the plotted series of consecutive OFDM data symbols where the primary estimate of the channel phase difference is likely to be correct. Preferably, the region is determined by corresponding a frequency to each OFDM data symbol; for each the frequency, calculating an average phase difference of a number of neighboring frequencies of a particular frequency of interest; calculating a variance of the neighboring frequencies to the particular frequency of interest; and calculating a mean value of the variance over an entire OFDM data symbol, wherein the region is defined as frequencies over which a value of the variance is below the average phase difference value.

Also, the method may further comprise combining a value of the average phase difference to the secondary estimate; mapping the combined value to a closest channel phase value of the second OFDM data symbol; and performing a sequence of backward and forward regressions on the secondary estimate. Moreover, the method may further comprise reducing a symbol error rate of the series of consecutive OFDM data symbols by a one order of magnitude by generating the corrected decisions.

Another embodiment provides a system of performing coherent detection for differentially encoded OFDM networks, the system comprising a series of consecutive OFDM data symbols in a DMB frame of a signal transmitted to a wireless receiver; a storage device adapted to store a channel phase value of a first OFDM data symbol in the series of consecutive OFDM data symbols; a calculator adapted to calculate a primary estimate of the channel phase difference by hard thresholding the first OFDM data symbol; an adder adapted to combine the channel phase value of the first OFDM data symbol with the primary estimate of the channel phase difference; a processor adapted to generate a secondary estimate of a the channel phase difference of a second OFDM data symbol based on the combined channel phase value of the first OFDM data symbol and the primary estimate of the channel phase difference, wherein the first and second OFDM data symbols are consecutive OFDM data symbols in the DMB frame; a module adapted to correct decisions of which OFDM data symbols to encode based on the secondary estimate of the channel phase difference; and a Viterbi decoder adapted to receive the corrected decisions and decode the OFDM data symbols.

Preferably, the calculation of the primary estimate by the calculator comprises shifting a signal phase of the signal by a predetermined value, and wherein a symbol error rate of the series of consecutive OFDM data symbols is reduced by a one order of magnitude by generating the corrected decisions.

Additionally, the system may further comprise means for plotting the series of consecutive OFDM data symbols in a graphical format and connect the plotted OFDM data symbols with a line. Also, the system may further comprise means for determining a region of the plotted series of consecutive OFDM data symbols where the primary estimate of the channel phase difference is likely to be correct.

Preferably, the region is determined by corresponding a frequency to each OFDM data symbol; for each the frequency, calculating an average phase difference of a number of neighboring frequencies of a particular frequency of interest; calculating a variance of the neighboring frequencies to the particular frequency of interest; and calculating a mean value of the variance over an entire OFDM data symbol, wherein the region is defined as frequencies over which a value of the variance is below the average phase difference value. Moreover, the system may further comprise means for combining a value of the average phase difference to the secondary estimate; means for mapping the combined value to a closest channel phase value of the second OFDM data symbol; and means for performing a sequence of backward and forward regressions on the secondary estimate.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new coherent detection technique for differentially encoded OFDM systems. The embodiments herein achieve this by providing a technique of estimating the channel phase difference between consecutive symbols. Referring now to the drawings, and more particularly to FIGS. 2 through 9, where similar reference characters denote corresponding features consistently throughout the figures, there are shown preferred embodiments.

Figure 2:
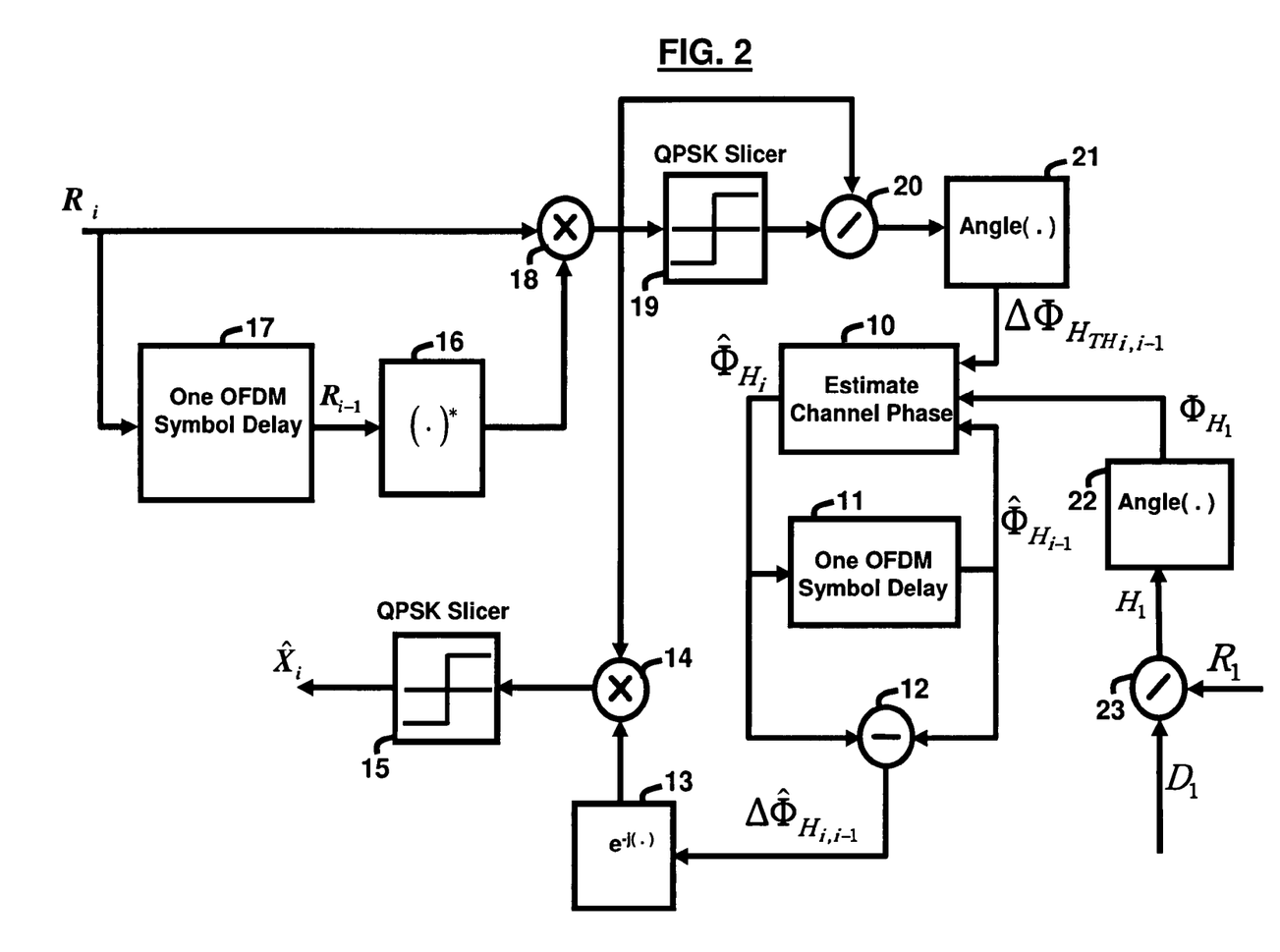
FIG. 2 is a block diagram illustrating a coherent detection strategy in DMB according to an embodiment herein.

One aspect of the coherent detection technique provided by the embodiments herein is to estimate the channel phase difference between consecutive symbols. If this is accomplished, then it is possible to correct for that change before providing the soft decisions to the Viterbi decoder. In other words, the soft decisions can be modified as follows:

$$R_i \times R^*_{i-1} \times e^{-j\Delta\Phi_H} = |D_{i-1}|^2 \times |H_i \times |H_{i-1}| \times X_i,$$

where $\Delta\Phi_H = \Phi_{H_i} - \Phi_{H_{i-1}}$ is the channel phase difference between the two consecutive OFDM symbols. The block diagram of the coherent detection scheme in DMB provided by the embodiments herein is shown in FIG. 2.

The coherent detection process starts by calculating (10) a rough estimate of the channel phase difference through hard thresholding. This is denoted by $\Delta\Phi_{H_{Thi,i-1}}$ and is obtained as shown in FIG. 2. This rough estimate is expected to be accurate for the carriers which did not undergo drastic channel phase changes. Now, noting that $H_1$ can be known perfectly since $D_1$ is the phase reference symbol, which is known perfectly at the receiver, i.e., $$H_1 = R_1/D_1,$$

the rough estimate, $\Delta\Phi_{H_{Thi,i-1}}$, can be used along with the knowledge of the phase of the channel seen by the previous symbol (starting with $H_1$) to estimate the channel phase over the next symbol. Having obtained that, a new estimate for the channel phase difference is calculated and is used to correct the soft decisions before being fed to the Viterbi decoder as mentioned earlier. The details of how the channel phase of the next symbol is estimated is described below.

FIG. 2 shows a block diagram of a method for coherent detection according to the embodiments herein. The received signal in OFDM symbol, $R_i$ is multiplied (18) by the complex conjugate of the previous OFDM symbol, $R_{i-1}$, which is obtained by one OFDM symbol delay (17) and a complex conjugation circuit 16. This soft decision is passed through a QPSK slicer 19 to obtain a hard decision. The soft decision is then divided (20) by the hard decisions. The channel phase change between the two OFDM symbols $\Delta\Phi_{H_{Thi,i-}}$ is then obtained by computing (20) the angle operation (21). For the first OFDM symbol, the channel $\Phi_{H_1}$ is computed from $R_1$ and $D_1$ using the division operation (23) and the angle operation (22). A channel estimate for each ODFM symbol, $\hat{\Phi}_{H_i}$, is computed from corresponding channel estimates and channel phase difference estimates (10). The channel phase difference between each two OFDM symbols is computed using one OFDM symbol delay (11) and a subtraction circuit 12. The channel phase difference is then passed through an exponent operation (13) and then multiplied (14) by the soft decision at the output of multiplier 18 to obtain a refined soft decision that is then passed through a QPSK slicer 15 to obtain the final hard decision $\hat{X}_i$.

Figure 3:
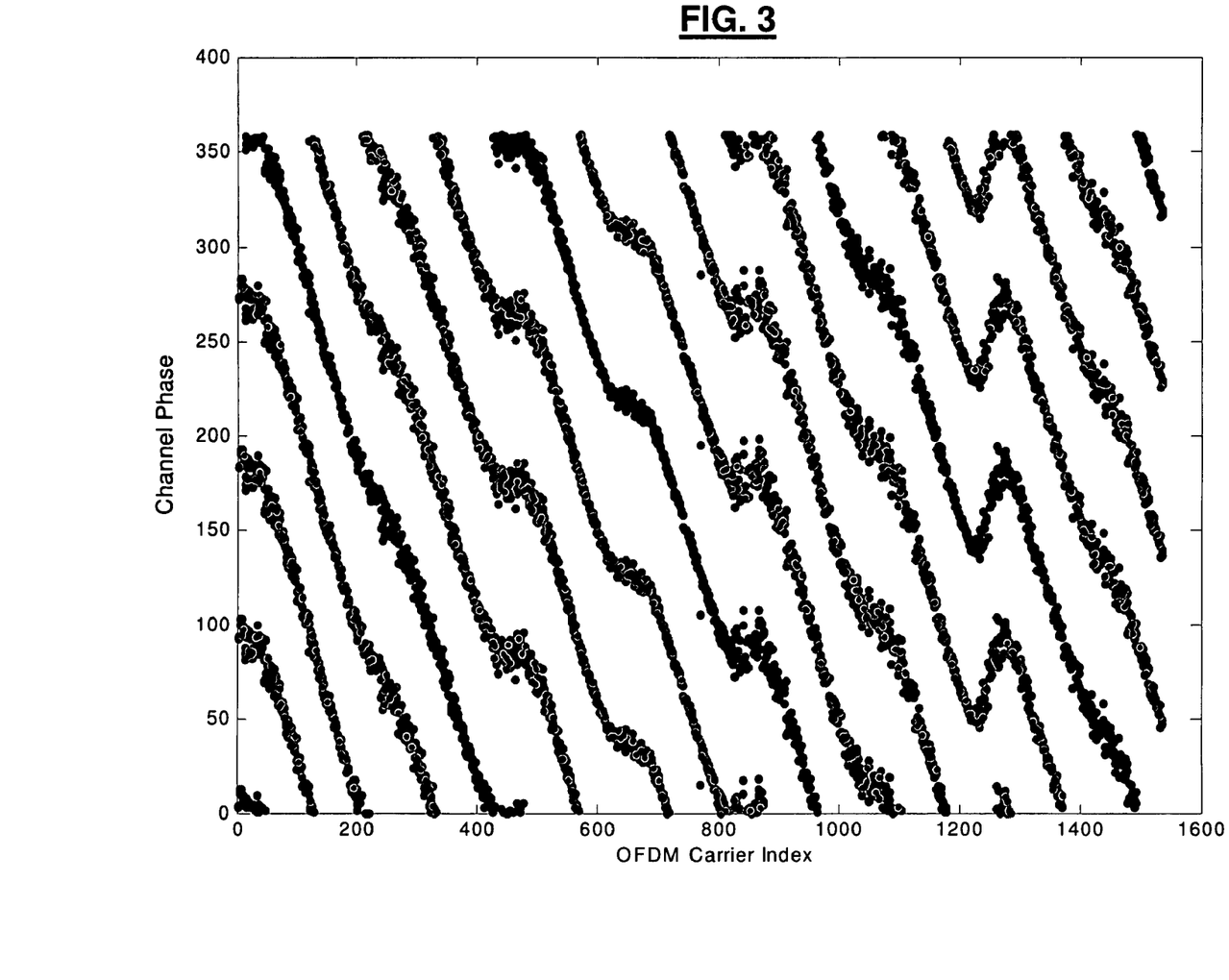
FIG. 3 is a graphical representation illustrating the result of shifting the received signal phase by the values admitted by $\Phi_{D_i}$ according to an embodiment herein.

The first thing to note here is that $$\Phi_{R_i} = \Phi_{D_i} + \Phi_{H_i}$$

where $\Phi_{D_i} \in \{0°, 90°, 180°, 270°\}$ for odd i and $\Phi_{D_i} \in \{45°, 135°, 225°, 315°\}$ for even i. It is clear that if one shifts the received signal phase by all the possible values that can be admitted by $\Phi_{D_i}$, one achieves the result shown in FIG. 3, assuming transmission mode I. In FIG. 3, each shade of gray/black represents the result of shifting $\Phi_{R_i}$ by a specific value for $\Phi_{D_i}$. Interestingly, if one follows a specific line among the set of lines shown from start to end, one will end up with the actual channel phase over the symbol within a fixed phase shift. More specifically, the line shown in black in FIG. 3 represents the contour of the channel phase over the symbol under consideration.

Figure 4:
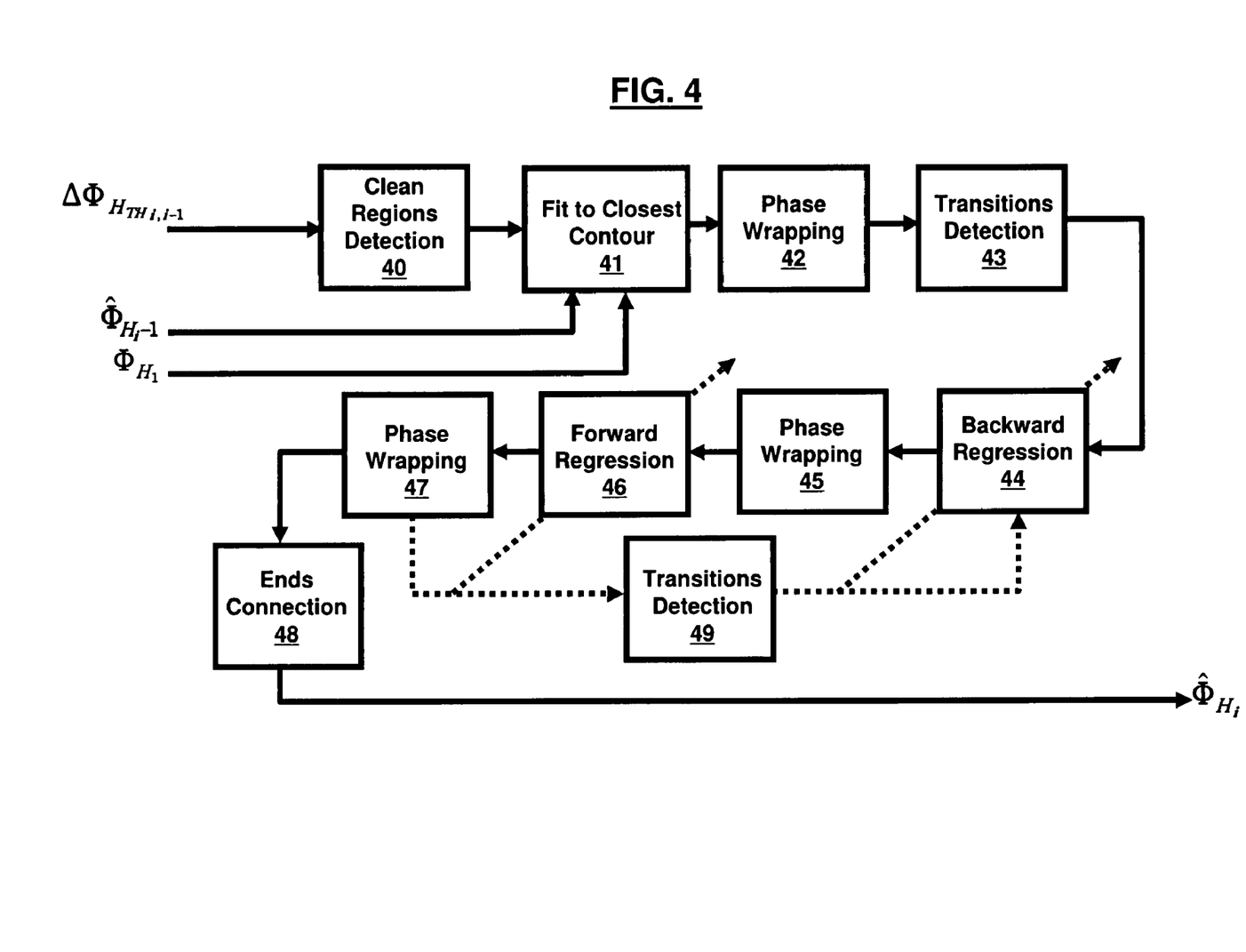
FIG. 4 is a block diagram illustrating a channel phase estimation process according to an embodiment herein.
Figure 5:
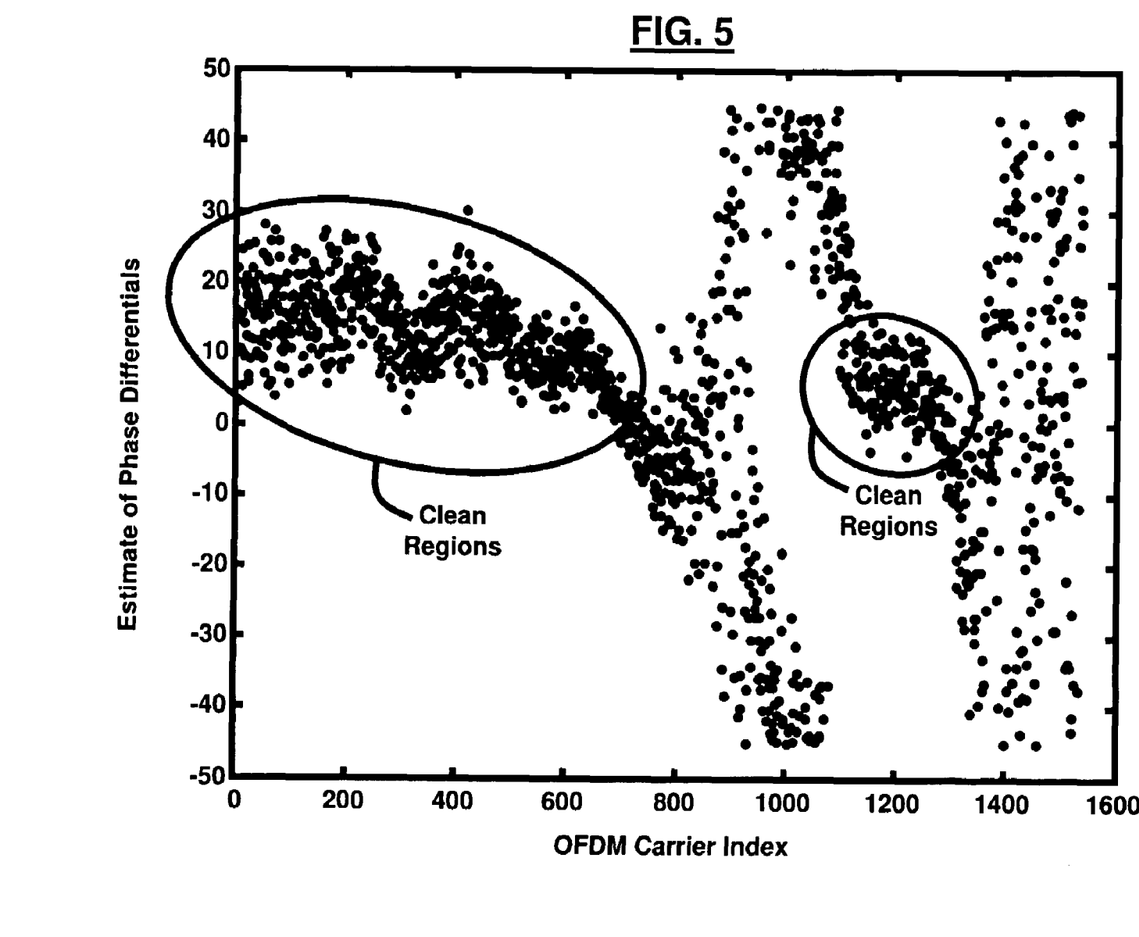
FIG. 5 is a graphical representation illustrating the rough phase differential based on hard thresholding showing the "clean regions" according to an embodiment herein.
Figure 6:
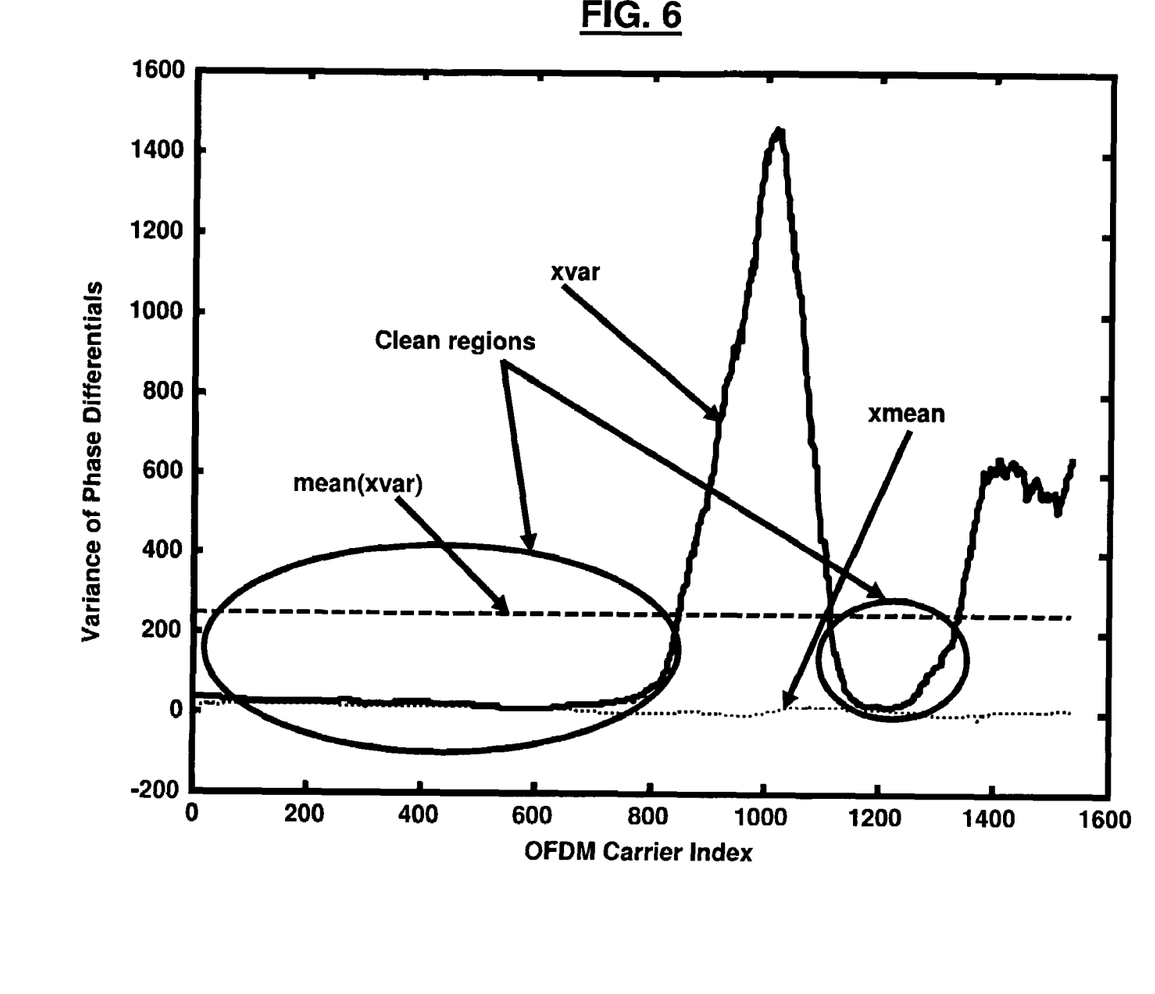
FIG. 6 is a graphical representation illustrating a definition of the "clean regions" of FIG. 5 according to an embodiment herein.

The problem now reduces to trying to accurately track a specific line among the set of lines. Towards that end, a block diagram for the basic procedure that is performed is shown in FIG. 4. The general procedure is as follows:

The process beings by estimating the regions where the hard threshold rough estimate of the phase difference might be correct. This is denoted by the block "Clean Regions Detection" (40). These clean regions are defined in FIG. 5, which shows the rough channel phase difference obtained via hard thresholding. For each frequency, the average phase difference of a number of the neighboring frequencies (to the left and the right of the frequency of interest) is calculated. This is denoted by "xmean" in FIG. 6 as well as the variance, which is denoted by "xvar". Also, the mean value of "xvar" is calculated over the entire symbol (denoted as "mean(xvar)"). The clean regions are defined as the frequencies over which the value of "xvar" is below the mean value "xmean".

Again with reference to FIG. 4, after determining these clean regions, the channel phase in the symbol under consideration over these frequencies is then estimated by adding "xmean" to the estimate of the channel phase of the previous symbol. The resulting values are then mapped (41) to the closest channel phase contour among the available contours. The resulting phase is then wrapped (42) around 360°.

The parts that are now missing in the estimated channel phase are populated using a sequence of backward and forward regressions 44, 46. In other words, for each missing point, an estimate is calculated using linear regression and the value closest to this estimate among the different channel phase contours is picked. The last procedure may be repeated multiple times with different regression window sizes and/or stopping criteria. Finally, any still missing parts are estimated by connecting straight lines between the end points and choosing the channel phase contour closest to this straight line.

More particularly, FIG. 4 shows a block diagram of the methodology used to estimate the channel phase from phase differentials. First clean regions for phase differentials are identified (40), the clean regions are then fit (41) to the closest contours. At this stage, disconnected contour segments result. The contour segments are then extended in forward and backward directions using several stages of phase wrapping (42, 45, and 47), backward regression (44), forward regression (46), and transition detection (43 and 49). Finally, the disconnected segments are joined (48) to get the desired channel estimate.

Figure 7A:
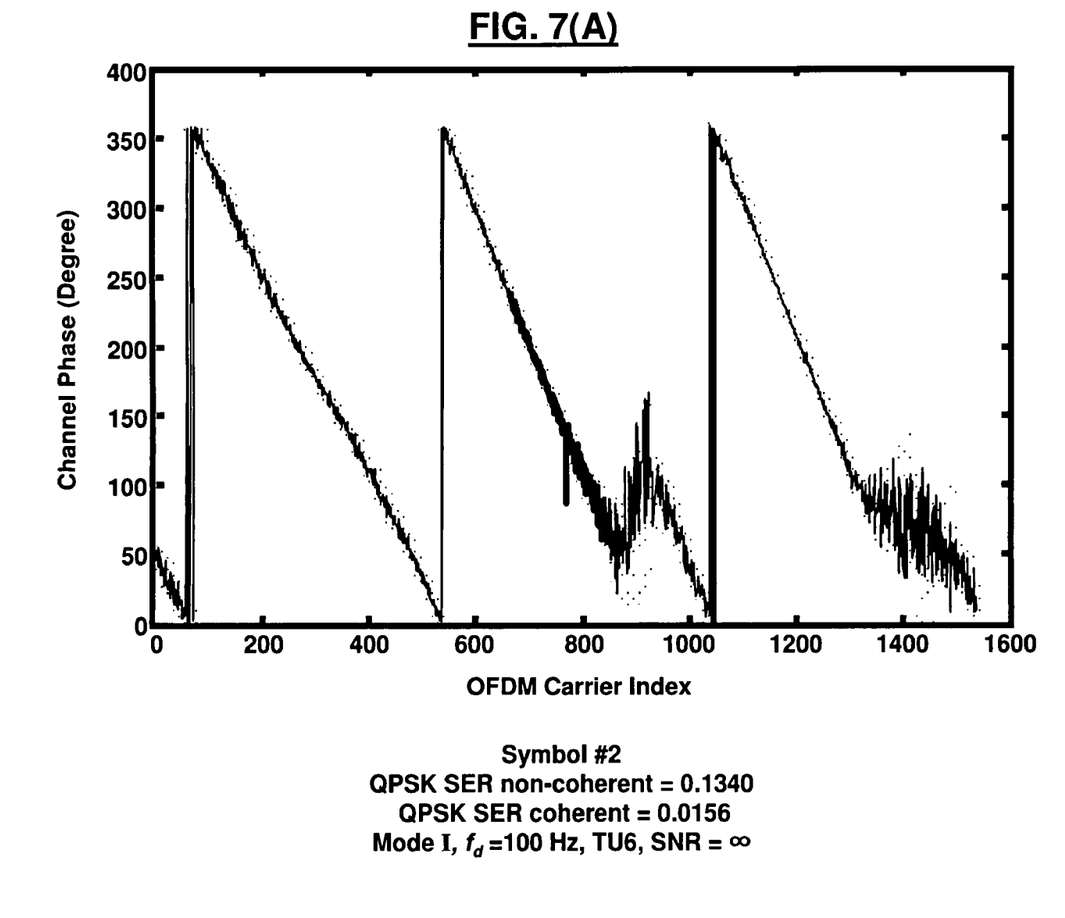
FIGS. 7(A) and 7(B) are graphical representations illustrating results achieved by the embodiments herein.
Figure 7B:
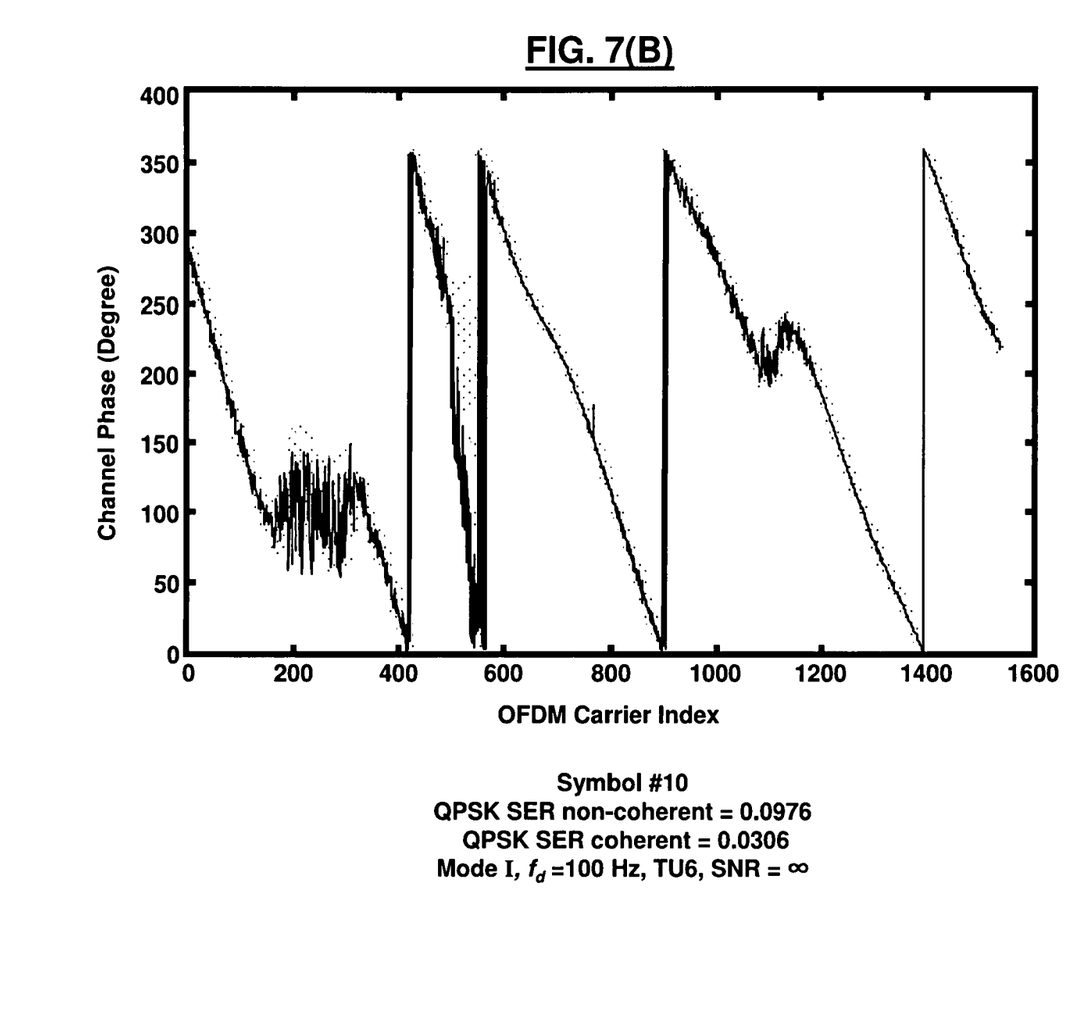

FIGS. 7(A) and 7(B) illustrate some results for the coherent detection technique provided by the embodiments herein over different symbols (Symbol #2 in FIG. 7(A) and Symbol #10 in FIG. 7(B)) assuming that the channel is ideally known (i.e., simply known without ambiguity) for the previous symbol. It is clear that when the phase estimation scheme succeeds in estimating the channel phase accurately, this leads to a significant improvement in the performance as evident by the one-order of magnitude reduction in the symbol error rate (SER) for Symbol #2 and a one-third reduction in the symbol error rate (SER) for Symbol #10.

Accordingly, the coherent detection technique provided by the embodiment herein is an improved and useful technique for significantly improving the performance of differentially encoded OFDM systems. Preferably, the embodiments herein are used in digital video broadcast for handheld devices, and may be implemented in the baseband chipsets that support mobile TV differentially encoded OFDM standards such as digital audio broadcasting (DAB), digital audio broadcasting internet protocol (DAB-IP), and T-DMB.

Figure 8:
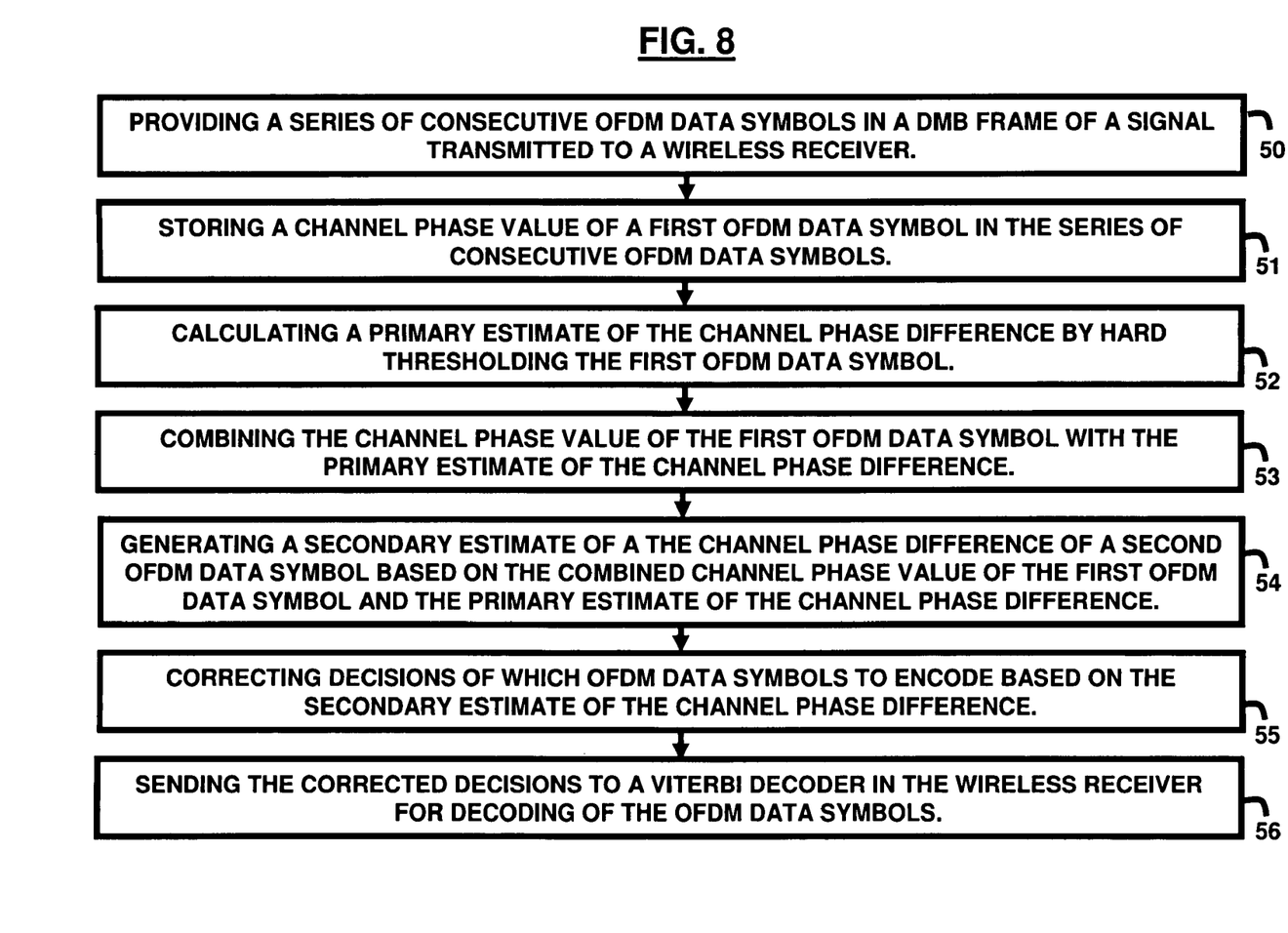
FIG. 8 is a flow diagram illustrating a preferred method according to an embodiment herein.

FIG. 8, with respect to FIGS. 1 through 7, is a flow diagram illustrating a method of performing coherent detection for differentially encoded OFDM systems according to an embodiment herein, wherein the method comprises providing (50) a series of consecutive OFDM data symbols $\hat{\Phi}_{H_i}$ in a DMB frame of a signal, $R_i$, transmitted to a wireless receiver (not shown); storing (51) a channel phase value of a first OFDM data symbol in the series of consecutive OFDM data symbols $\hat{\Phi}_{H_i}$; calculating (52) a primary estimate $\Delta\Phi_{H_{Thi,i-1}}$ of the channel phase difference by hard thresholding the first OFDM data symbol; combining (53) the channel phase value of the first OFDM data symbol with the primary estimate $\Delta\Phi_{H_{Thi,i-1}}$ of the channel phase difference; generating (54) a secondary estimate of a the channel phase difference of a second OFDM data symbol based on the combined channel phase value of the first OFDM data symbol and the primary estimate $\Delta\Phi_{H_{Thi,i-1}}$ of the channel phase difference, wherein the first and second OFDM data symbols are consecutive OFDM data symbols $\hat{\Phi}_{H_i}$ in the DMB frame; correcting (55) decisions of which OFDM data symbols to encode based on the secondary estimate of the channel phase difference; and sending (56) the corrected decisions to a Viterbi decoder (not shown) in the wireless receiver for decoding of the OFDM data symbols $\hat{\Phi}_{H_i}$.

Preferably, the calculation (52) of the primary estimate comprises shifting a signal phase of the signal by a predetermined value. Moreover, the method may further comprise plotting the series of consecutive OFDM data symbols $\hat{\Phi}_{H_i}$ in a graphical format; and connecting the plotted OFDM data symbols $\hat{\Phi}_{H_i}$ with a line. Additionally, the method may further comprise determining a region of the plotted series of consecutive OFDM data symbols $\hat{\Phi}_{H_i}$ where the primary estimate $\Delta\Phi_{H_i}$ of the channel phase difference is likely to be correct. Preferably, the region is determined by corresponding a frequency to each OFDM data symbol $\hat{\Phi}_{H_i}$; for each the frequency, calculating an average phase difference, "xmean", of a number of neighboring frequencies of a particular frequency of interest; calculating a variance, "xvar", of the neighboring frequencies to the particular frequency of interest; and calculating a mean value of the variance, "mean (xvar)", over an entire OFDM data symbol $\hat{\Phi}_{H_i}$ wherein the region is defined as frequencies over which a value of the variance, "xvar", is below the value, "xmean".

Also, the method may further comprise combining a value of the average phase difference, "xmean", to the secondary estimate; mapping the combined value to a closest channel phase value of the second OFDM data symbol; and performing a sequence of backward and forward regressions on the secondary estimate. Moreover, the method may further comprise reducing a symbol error rate of the series of consecutive OFDM data symbols by a one order of magnitude by generating the corrected decisions.

The techniques provided by the embodiments herein may be implemented on an integrated circuit chip (not shown) and may be used in digital video broadcast systems for handheld devices, and implemented in the baseband chip sets that support standards such as DAB, DAB-IP, and T-DMB, for example. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software includes, but is not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
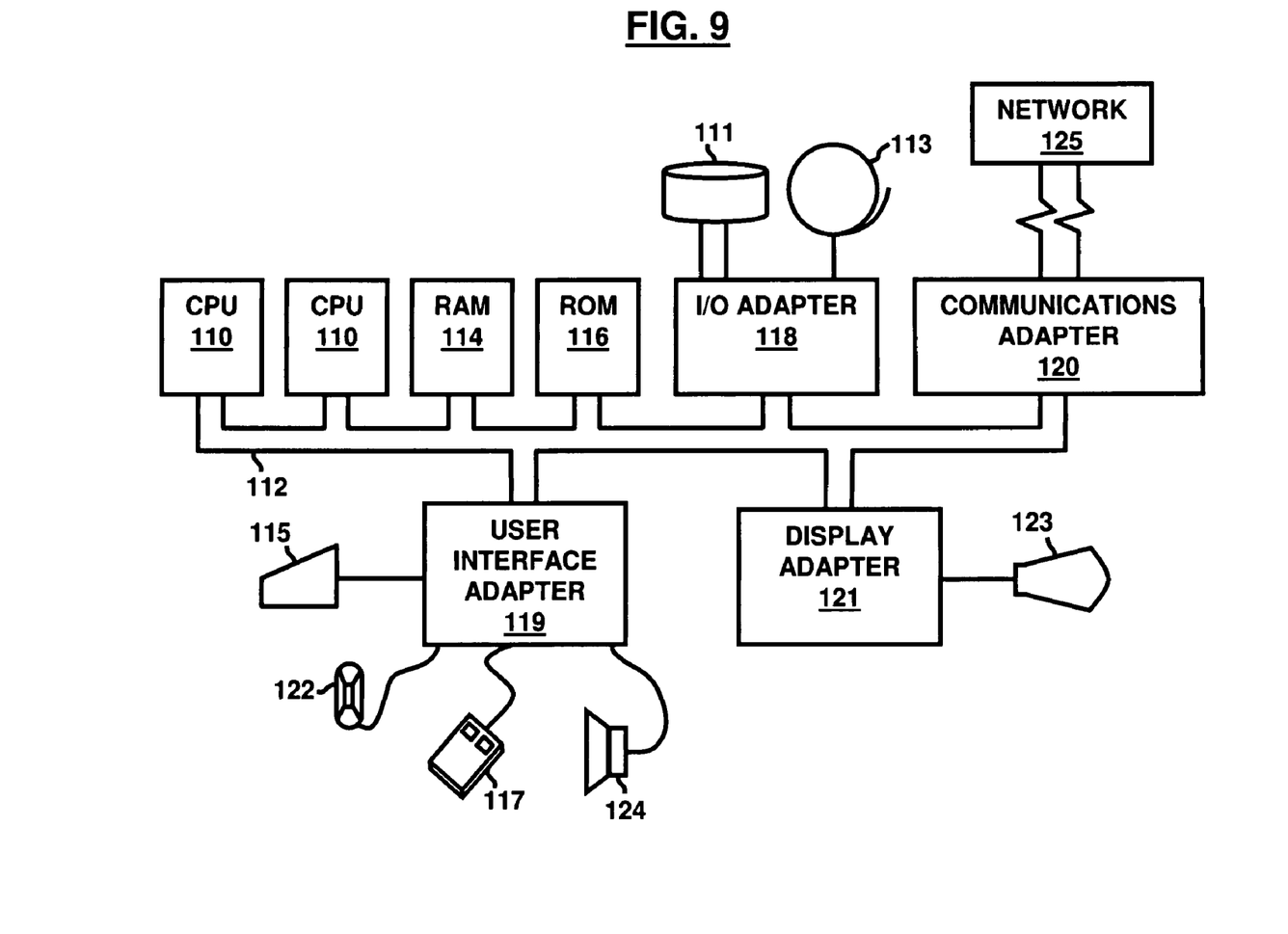
FIG. 9 illustrates a schematic diagram of a computer system used in accordance with the embodiments herein.

A representative hardware environment for practicing the embodiments herein is depicted in FIG. 9. This schematic drawing illustrates a hardware configuration of an information handling/computer system in accordance with the embodiments herein. The system comprises at least one processor or central processing unit (CPU) 110. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as disk units 111 and tape drives 113, or other program storage devices that are readable by the system. The system can read the inventive instructions on the program storage devices and follow these instructions to execute the methodology of the embodiments herein. The system further includes a user interface adapter 119 that connects a keyboard 115, mouse 117, speaker 124, microphone 122, and/or other user interface devices such as a touch screen device (not shown) to the bus 112 to gather user input. Additionally, a communication adapter 120 connects the bus 112 to a data processing network 125, and a display adapter 121 connects the bus 112 to a display device 123 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of performing coherent detection for differentially encoded orthogonal-frequency-division-multiplexing (OFDM) systems, said method comprising:
    providing a series of consecutive OFDM data symbols in a digital multimedia broadcasting (DMB) frame of a signal received by a receiver;
    storing a channel phase value of a first OFDM data symbol in said series of consecutive OFDM data symbols;
    calculating a primary estimate of a channel phase difference by hard thresholding said first OFDM data symbol;
    combining said channel phase value of said first OFDM data symbol with said primary estimate of said channel phase difference;

generating a secondary estimate of a said channel phase difference of a second OFDM data symbol based on the combined channel phase value of said first OFDM data symbol and said primary estimate of said channel phase difference, wherein the first and second OFDM data symbols are consecutive OFDM data symbols in said DMB frame;

correcting decisions of which OFDM data symbols to encode based on said secondary estimate of said channel phase difference;

sending the corrected decisions to a Viterbi decoder in said receiver for decoding of said OFDM data symbols;

plotting said series of consecutive OFDM data symbols in a graphical format;

connecting the plotted OFDM data symbols with a line; and determining a region of the plotted series of consecutive OFDM data symbols where said primary estimate of said channel phase difference is likely to be correct, wherein said region is determined by: corresponding a frequency to each OFDM data symbol; for each said frequency, calculating an average phase difference of a number of neighboring frequencies of a particular frequency of interest; calculating a variance of said neighboring frequencies to said particular frequency of interest; and calculating a mean value of said variance over an entire OFDM data symbol, wherein said region is defined as frequencies over which a value of said variance is below said mean value of said variance.

2. The method of claim 1, wherein the calculation of said primary estimate comprises shifting a signal phase of said signal by a predetermined value.

3. The method of claim 1, wherein said receiver comprises a wireless receiver.

4. The method of claim 3, wherein said wireless receiver comprises a digital video broadcast for handheld device.

5. The method of claim 1, wherein said OFDM systems comprise any of DAB, DAB-IP, and T-DMB systems.

6. The method of claim 1, further comprising:
combining a value of said average phase difference to said secondary estimate;
mapping the combined value to a closest channel phase value of said second OFDM data symbol; and
performing a sequence of backward and forward regressions on said secondary estimate.

7. The method of claim 1, further comprising reducing a symbol error rate of said series of consecutive OFDM data symbols by a one order of magnitude by generating said corrected decisions.

8. A program storage device readable by computer comprising a program of instructions executable by said computer to perform a method of performing coherent detection for differentially encoded OFDM systems, said method comprising:
providing a series of consecutive OFDM data symbols in a digital multimedia broadcasting (DMB) frame of a signal received by a receiver;
storing a channel phase value of a first OFDM data symbol in said series of consecutive OFDM data symbols;
calculating a primary estimate of a channel phase difference by hard thresholding said first OFDM data symbol;
combining said channel phase value of said first OFDM data symbol with said primary estimate of said channel phase difference;
generating a secondary estimate of a said channel phase difference of a second OFDM data symbol based on the combined channel phase value of said first OFDM data symbol and said primary estimate of said channel phase difference, wherein the first and second OFDM data symbols are consecutive OFDM data symbols in said DMB frame;

correcting decisions of which OFDM data symbols to encode based on said secondary estimate of said channel phase difference;

sending the corrected decisions to a Viterbi decoder in said receiver for decoding of said OFDM data symbols;

plotting said series of consecutive OFDM data symbols in a graphical format;

connecting the plotted OFDM data symbols with a line; and determining a region of the plotted series of consecutive OFDM data symbols where said primary estimate of said channel phase difference is likely to be correct, wherein said region is determined by: corresponding a frequency to each OFDM data symbol; for each said frequency, calculating an average phase difference of a number of neighboring frequencies of a particular frequency of interest; calculating a variance of said neighboring frequencies to said particular frequency of interest; and calculating a mean value of said variance over an entire OFDM data symbol, wherein said region is defined as frequencies over which a value of said variance is below said mean value of said variance.

9. The program storage device of claim 8, wherein the calculation of said primary estimate comprises shifting a signal phase of said signal by a predetermined value.

10. The program storage device of claim 8, wherein said receiver comprises a wireless receiver.

11. The program storage device of claim 10, wherein said wireless receiver comprises a digital video broadcast for handheld device.

12. The program storage device of claim 8, wherein said OFDM systems comprise any of DAB, DAB-IP, and T-DMB systems.

13. The program storage device of claim 8, wherein said method further comprises:
combining a value of said average phase difference to said secondary estimate;
mapping the combined value to a closest channel phase value of said second OFDM data symbol; and
performing a sequence of backward and forward regressions on said secondary estimate.

14. The program storage device of claim 8, wherein said method further comprises reducing a symbol error rate of said series of consecutive OFDM data symbols by a one order of magnitude by generating said corrected decisions.

15. A system of performing coherent detection for differentially encoded orthogonal-frequency-division-multiplexing (OFDM) networks, said system comprising:
a series of consecutive OFDM data symbols in a digital multimedia broadcasting (DMB) frame of a signal received by a receiver;
a storage device adapted to store a channel phase value of a first OFDM data symbol in said series of consecutive OFDM data symbols;
a calculator adapted to calculate a primary estimate of a channel phase difference by hard thresholding said first OFDM data symbol;
an adder adapted to combine said channel phase value of said first OFDM data symbol with said primary estimate of said channel phase difference;
a processor adapted to generate a secondary estimate of a said channel phase difference of a second OFDM data symbol based on the combined channel phase value of said first OFDM data symbol and said primary estimate of said channel phase difference, wherein the first and second OFDM data symbols are consecutive OFDM data symbols in said DMB frame;

a module adapted to correct decisions of which OFDM data symbols to encode based on said secondary estimate of said channel phase difference;

a Viterbi decoder adapted to receive the corrected decisions and decode said OFDM data symbols;

means for plotting said series of consecutive OFDM data symbols in a graphical format and connect the plotted OFDM data symbols with a line; and means for determining a region of the plotted series of consecutive OFDM data symbols where said primary estimate of said channel phase difference is likely to be correct, wherein said region is determined by: corresponding a frequency to each OFDM data symbol; for each said frequency, calculating an average phase difference of a number of neighboring frequencies of a particular frequency of interest; calculating a variance of said neighboring frequencies to said particular frequency of interest; and calculating a mean value of said variance over an entire OFDM data symbol, wherein said region is defined as frequencies over which a value of said below said mean value of said variance.

16. The system of claim 15, wherein the calculation of said primary estimate by said calculator comprises shifting a signal phase of said signal by a predetermined value, and wherein a symbol error rate of said series of consecutive OFDM data symbols is reduced by a one order of magnitude by generating said corrected decisions.

17. The system of claim 15, wherein said receiver comprises a wireless receiver.

18. The system of claim 17, wherein said wireless receiver comprises a digital video broadcast for handheld device.

19. The system of claim 15, wherein said OFDM networks comprise any of DAB, DAB-IP, and T-DMB systems.

20. The system of claim 15, further comprising:
means for combining a value of said average phase difference to said secondary estimate;
means for mapping the combined value to a closest channel phase value of said second OFDM data symbol; and
means for performing a sequence of backward and forward regressions on said secondary estimate.

* * * * *